(12) United States Patent
Breuksch et al.

(10) Patent No.: US 7,022,411 B2
(45) Date of Patent: Apr. 4, 2006

(54) PRESSURE AND VACUUM-DEFORMABLE, GRAINED BONDING FOIL, METHOD FOR ITS MANUFACTURE AND ITS UTILIZATION

(75) Inventors: Ulrich Breuksch, Lindwedel (DE); Hans-Hinrich Kruse, Barsinghausen (DE); Claus Zürbig, Hannover (DE)

(73) Assignee: Benecke-Kaliko AG, (DE)

(\*) Notice: Subject to any disclaimer, the term of this patent is extended or adjusted under 35 U.S.C. 154(b) by 1029 days.

(21) Appl. No.: 09/789,248

(22) Filed: Feb. 20, 2001

(65) Prior Publication Data

US 2001/0028957 A1    Oct. 11, 2001

(30) Foreign Application Priority Data

Feb. 21, 2000 (DE) .............................. 100 07 884

(51) Int. Cl.
*B32B 27/40* (2006.01)
*C25D 9/02* (2006.01)

(52) U.S. Cl. ............................... 428/425.8; 428/425.9; 428/423.1

(58) Field of Classification Search ............. 428/423.1, 428/423.3, 424.2, 424.4, 424.6, 424.7, 424.8, 428/577, 607, 615, 617, 71, 158, 160, 425.8, 428/425.9, 462, 463; 427/322, 407.1
See application file for complete search history.

(56) References Cited

U.S. PATENT DOCUMENTS 5,242,750 A     9/1993   Wagner et al.
5,527,602 A  *  6/1996   Eisen et al. ................. 312/401
6,001,464 A    12/1999   Schultze et al.

FOREIGN PATENT DOCUMENTS

| DE | 36 15 028 A1 | 11/1987 |
|----|--------------|---------|
| DE | 39 38 629 A1 | 5/1991  |
| DE | 40 22 741 A1 | 1/1992  |
| DE | 42 14 192 A1 | 11/1993 |
| DE | 43 06 276 A1 | 4/1994  |
| DE | 43 15 663 A1 | 11/1994 |
| DE | 196 14 091 A1 | 10/1997 |
| DE | 196 25 753 A1 | 1/1998  |

\* cited by examiner

*Primary Examiner*—Thao Tran
(74) *Attorney, Agent, or Firm*—Fay, Sharpe, Fagan, Minnich & McKee, LLP

(57) ABSTRACT

The invention relates to a pressure and vacuum deformable, grained bonding foil for linings of motor vehicle interiors with at least one support layer, a single or multi-layer bed of polyurethane, and also, if applicable, an adhesion facilitator layer, arranged in between, a primary layer and also additional conventional layers, whereby the layer of polyurethane has a Shore D Hardness of less than 50, specifically less than approximately 48. Subject of the invention is also a method for the manufacture of the bonding foil as well as its utilization for lining the interiors of motor vehicles. Said bonding foil demonstrates excellent manipulation properties and presents outstanding physical/mechanical properties, such as excellent breaking elongation, grain stability, scratch resistance, high resistance to wear and tear, high UV-resistance, excellent solvent resistance as well as very high thermal aging resistance.

11 Claims, 1 Drawing Sheet

Figure 1:
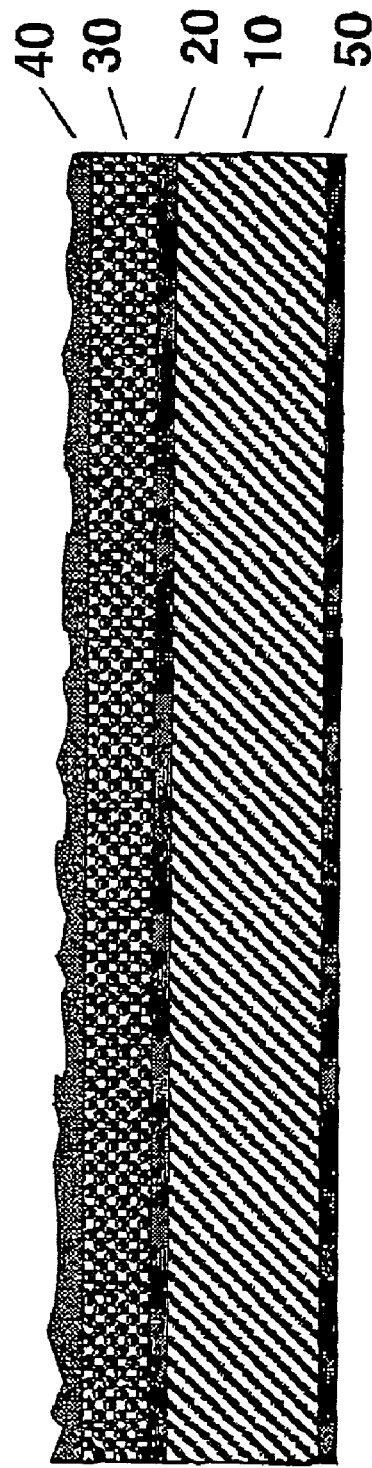

PRESSURE AND VACUUM-DEFORMABLE, GRAINED BONDING FOIL, METHOD FOR ITS MANUFACTURE AND ITS UTILIZATION

The invention relates to a pressure and vacuum-deformable, grained bonding foil for linings of motor vehicle interiors with at least one support layer, a single or multilayer bed of a polyurethane and also, if applicable, an adhesion facilitator layer, a primary layer, as well as additional conventional layers.

Bonding foils are combinations of materials which are made of different substances and which are superior to the individual materials in their physical-chemical and mechanical properties. The general construction results from a support material, which determines, for example, the firmness and extensibility, and a surface or top coating, which is responsible, among others, for the wear and impact resistance.

A distinction is hereby made between one and two component layer systems, whereby the single-component layer are suitable for this films in the form of solution or dispersion, and two-component systems can be employed in the form of so-called "high-solids-systems", relative to which, during the polymerization, the molecular weight of the polymer is successively constructed by means of a chain lengthener. This involves high solids, low solvent compounds, which are increasingly being employed based on their environmentally friendly nature.

Bonding sheets with one or two component systems have long been known in the state of the art. Thus, U.S. Pat. No. 5,149,589 describes a thermoplastic elastomer compound melted onto a rigid, synthetic resin material, which comprises a thermoplastic elastomer of hydrated SBS-block-co-polymer, olefin, diene or urethane elastomer and a thermoplastic polyester elastomer.

FR 2,445,223 relates to a two-layer system in which layer A constitutes a polyolefin, a polyamide, a saturated polyester, a polyacrylate, a polyether, a polycarbonate, a polyurethane, a polyvinylchloride, a thermo-hardenable resin, vulcanized caoutchouc, glass or paper and layer B is made of styrene-butadiene-co-polymer grafted with unsaturated carbonic acids or their derivatives.

Multi-layer polyurethane foils are known from DE 40 22 741 A1, whereby at least two layers of the bonding bed comprise thermoplastic polyurethanes having a different Shore hardness. One of the layers preferably has a Shore A Hardness from 60 to 98 and another layer a Shore B Hardness from 50 to 74.

In Patent Documents DE 39 38 629 C2 and EP 0 429 020 B1, a description is given of a pressure and vacuum-deformable, grained foam sheet, whereby the decorative layer comprises an inner and an outer polyurethane layer, and the foam layer is constructed of foamed polyolefin having a certain density, breaking elongation, strain hardness and thickness. Said foil, which can be used for linings of motor vehicle interiors, was, however, unable to compete on the market. It lacks satisfactory properties, similar to the earlier described foils. Based on the employed materials—polyurethane and polyolefin—the available foam foil is very expensive and therefore unprofitable. Certain properties, such as a desired tactile hand-feel effect, are not achieved by the foil. Also, it is not possible to realize narrow radii, which are required, for example, with respect to automobile industry designs. Additionally, the foil lacks sufficient firmness and dimensional stability in order to be processed according to the current state of the art methods. Deep drawing and subsequent back-foaming is not possible.

Furthermore, EP 0 567 883 B1 describes a bonding foil of at least one layer of an ABS plastic and at least one layer of a thermoplastic polyurethane with a Shore D Hardness of >50, whereby an adhesion facilitator layer may be present between the ABS layer and the thermoplastic polyurethane layer. The adhesion facilitator layer itself preferably consists of the named thermal polyurethane. The bonding foil is employed in manufacture of refrigerator interior containers, whereby the primary factor of consideration is resistance vis-a-vis chemicals, such as fluorinated hydrocarbons. These proposed molded bonding shapes have the drawback in that they are unsuitable for the intended application according to the invention because of tactile reasons. Moreover, with respect to useable materials, there is only little possibility for variability relative to molded bonding shapes of thermoplastic polyurethane and ABS plastics.

Thus, it is the object of the invention to further improve the initially described bonding foils in such manner that the selection of starting materials can be designed more flexibly while maintaining the beneficial properties and, in some instances, improving the properties. The above mentioned drawbacks of the state of the art should be avoided. A bonding foil should be made available which constitutes a deep-drawable compact foil with improved tactile feeling. Furthermore, the layers should be designed in such manner that it is possible to process same according to standard methods and on standard equipment.

According to the invention, the above described object is solved by a pressure-and-vacuum deformable, grained bonding foil for linings of vehicle interiors with at least one support layer, a one or multi-layer bed of polyurethane, as well as, if applicable, an adhesion facilitator layer arranged in between, a primary layer and also additional conventional layers, whereby the polyurethane layer has a Shore D Hardness of less than 50, specifically less than approximately 48.

To that end, according to the invention, a compact support layer is selected which can be processed in known fashion by way of standard methods and on standard equipment and ensures the required deformation capability and resistance of the foil according to the invention. It has a support function and guarantees the deep-draw capability, in particular also in the direction of representing three-dimensional structures. The utilizable materials of the support layer within the scope of the invention are not specifically restricted. Preferably it is constructed of at least one thermoplast. The material categories that come under consideration for said purpose are, for example, acrylonitrile-butadiene-styrene-co-polymerizates (ABS), acrylonitrile-styrene-acrylic-ester-copolymerisates (ASA), polyvinylchloride (PVC)/ABS-blends, thermoplastic olefins which, perhaps, may permit high frequency fusibility of the foil, ABS/ASA-blends, polyesters, such as polyethylene-terephthalate for example with appropriate hardness at ambient temperature, thermoplastic polyurethanes, which demonstrate special benefits during subsequent back-foaming with polyurethane reactive foam, for example, as well as mixtures thereof The deformable, preferably deep-drawable support layer has preferably a breaking elongation (according to DIN EN ISO 527 Section 39) of approximately 50 to 500, specifically of approximately 100 to 300. The provided bonding foils according the invention moreover seek a dimensional stability after the deformation and at ambient temperature of preferably smaller than 2%. Their thickness is approximately 0.2 to 2 mm, preferably approximately 0.4 to 1.4 mm and more specifically approximately 0.8 to 1 mm. The Shore D Hardness, according to a preferred specific embodiment lies at no less than approximately 20, specifically at approximately 30 to 60 and particularly preferred lies at approximately 35 to 60.

According to the invention, numerous combinations and variations are possible for the polyurethane-layers. The one or multi-layered polyurethane layers can be 1) thermoplastic and 2) elastomeric, whereby the Shore D Hardness always lies below 50. If a thermoplastic polyurethane is selected, it can be designed in one layer or multi-layered. In case of a single layer specific embodiment, aliphatic di-isocyanates are preferably reacted with a polyhydroxy compound. With a multi-layered variation, aliphatic di-isocyanates, in particular as cover or top coating, or aromatic di-isocyanates with a polyhydroxy compound are preferably reacted to the desired polyurethane. According to another invention specific variation the thermoplastic polyurethane can be formed or preformed into a foil. A reactive "high solids system" can preferably also be employed for the thermoplastic polyurethane layer. Systems of this type are known to the expert. When utilizing the reactive "high solids system" both aliphatic and aromatic di-isocyanates are employable, which are reacted to the corresponding polyurethane with polyhydroxy compounds. If a multi-layer construction is selected for the thermoplastic polyurethane layer, an additional foamed sub-layer is employed, if appropriate.

With respect to the totality of the above described specific embodiments for the formation of a single or multi-layered thermoplastic polyurethane layer, none of the addressed layers is interlinked, so that the thermoplastic characteristics of the layers remain intact. If an elastic polyurethane is selected as the polyurethane layer according to the invention, said layer can likewise have one single layer or several layers.

In case of single-layer embodiment, aliphatic di-isocyanate is preferably reacted with a polyhydroxy compound. With the multi-layered variation, aliphatic di-isocyanates, specifically as cover or top layer, or aromatic di-isocyanates, are preferably reacted to polyurethane with a polyhydroxy compound. It is possible to combine into an additional layer, solution produced polyurethanes in a layer with reactive "high solids systems".

It is also possible to combine reactive "high solids system" in one layer with a like or a different reactive "high solids system" in another layer. If a multi-layer construction is selected for the elastic polyurethane layer, an additional foamed sub-layer is employed, if needed.

With all of the above described specific embodiments for the formation of a single or multi-layered elastic polyurethane layer, each of the addressed layers is interlinked. Appropriate subsequent interlinking of the layers can also take place.

The above described di-isocyanates for producing the polyurethanes are not subject to any restriction whatsoever. Preferably employed aliphatic di-isocyanates are, for example, hexamethylene-di-isocyanate, isophoron-di-isocyanates, 1.4-di-cyclohexane-di-isocyanate as well as mixtures thereof. Preferably employed aromatic di-isocyanate are, 2.4-toluylene-di-isocyanate, 2.2', 2.4'- and 4.4'-diphenylmethane-di-isocyanate, 4.4'-di-isocyanate-diphenylethane-(1.2), 1.5-naphthylene-di-isocyanate and mixtures thereof The selection of the employed polyhydroxy compounds according to the invention is likewise not specifically restricted. These may be aliphatic as well as aromatic. Preferred polyhydroxy compounds are polyetherpolyoles, such as polyetherdioles, a polytetramethylene-ether-dioles, polyesterpolyoles such as ethane-diol-polyadipate, 1.4-butane-diol-polyadipate, ethane-diol-butandiol-1.4-polyadipate, 1.6-hexane-diol-neopentyl-glycol-polyadipate, polycaprolactone, hydroxy group containing polymers such as polyacetals, poly(oxypropylene)glycols, glycols of dimeric aliphatic acids and mixtures of same.

The polyurethane layer can also be made of a soluble polyurethane. An additional layer of an interlinked polyurethane system is preferably formed between the support layer and the layer of soluble polyurethane by means of a reactive high solids polyurethane (PUR) system. In order to form the interlinked polyurethane layer, it is possible to employ a reactive high-solids-polyurethane(PUR)-system using approximately 100 parts by weight of polyetherpolyol, approximately 400 parts by weight of methylene-di-isocyanate and approximately 10 parts by weight of a catalyst, especially nickel-acetyl-acetonate (10% in polyoxypropylene-glycol).

An invention specific compact polyurethane layer as a cover layer has a thickness of approximately 0.1 to 2 mm, preferably approximately 0.3 to 7 mm, and specifically approximately 0.45 to 0.55 mm. An optionally present additional polyurethane-(foam)-layer has a thickness, for example, of approximately 0.2 to 0.6 mm. In order to save mass, the cover layer of polyurethane, which can be designed as decorative layer, can be designed relatively thin and has then a thickness of approximately 0.02 to 0.2 mm. The decorative layer influences the color, the degree of sheen as well as the physical and chemical stability. The entirety of the structure then has an effect upon the tactile feel.

The representation of surface structures on the cover or decorative layer can take place in known fashion. Conventional techniques known to the expert can be employed with any selected grain pattern. Genuine leather grain pattern is also possible. The grain marking can be formed by casting or also by impressing, for example, according to the negative draw method. A possible method for the manufacture of plastic foils on a tape is described, for example, in DE 44 22 871.

In the majority of the technical application cases, it is particularly appropriate to form a primary layer between support layer and cover layer. Its formation and chemical characteristics depend upon the respectively employed substrates. To that end, one or several layers may be applied, which, on one side, ensure adhesion to the top layer and, on the other side, adhesion to the support material. This is especially appropriate for further processing of a polyurethane layer lacking adhesive property. On the exposed surface of the support layer may also be arranged a reverse side adhesive varnish.

The cover and/or decorative layer and the basic layer can be joined with each other by means of various known techniques. To that end, conventional glues can be employed, glue laminates and adhesive foils such as fusible glue foils. Preferred are durable surface covering layers of glue, with little thickness, which do not affect the other layers in their properties and characteristics, including the processability of the finished product. The single or multi-layered glue layer is preferably not thicker than 0.2 mm. Single or multi-layered adhesive layers in form of solvent glues or dispersion glues are preferred. In particular, polyurethane glues are used, such as 2-K-PUR-systems.

The attached FIG. 1 explains an exemplary construction of an invention specific pressure and vacuum deformable, grained, deep-drawable bonding foil. Accordingly, the cover or decorative layer is composed of a polyurethane top layer (40) and an optional additional polyurethane foam layer (30). Then follows an adhesive layer (20) which flatly joins the polyurethane foam layer (30) with the support layer (10). On the side of support layer (10) facing away from the adhesive layer (20), there may be arranged, if applicable, a reverse side adhesive varnish (50).

The subject of the invention is also a method for producing a bonding foil, whereby:

I) one or several polyurethane layer(s) is/are applied by means of a spreader blade onto a non-sticky, grained auxiliary carrier in form of a solution of a thermoplasstic polyurethane, then dried and with subsequent application by spreader blade of a spreadable mass capable of forming a polyurethane according to composition (A), which contains:

a) a polyol HO—$R^1$—OH with primary and/or secondary end-stationed hydroxy functionalities.

II) a di-isocyanate OCN—$R^2$—NCO and/or a di-isocyanate prepolymer OCN—$R^2$—NH—CO—O—$R^1$—O—CO—NH—$R^2$—NCO, whereby $R^1$ and $R^2$ stand, independently from each other, for an organic residue which comprises aliphatic, cyclo-aliphatic, aromatic and/or hetero-cyclical groups and III) a catalyst, (b) is hardened by means of heat and (c) the bonding foil—if applicable after hardening of the adhesive layer is removed from the tape.

The residue O—R1-O has a molecular weight of preferably 2000 to 12000 with the above described polyols being preferably employed. The primary and secondary hydroxy functionalities of the employed polyol are preferably in proportion from approximately 2:1 to 1:6. It is possible to employ bi-functional and/or tri-functional polyols, for example in proportion from approximately 1:2 to 5:1. The use of homopolar polyester polyols leads to hydrolytically and thermally particularly stable systems.

The employable di-isocyanate compounds to which the residue $R^2$ reverts, are not subject to any type of restriction. Several compounds were already named by way of example. A metal acetyl-acetonate is employed as preferred catalyst, whereby nickel-acetylacetonate has proven itself as particularly suitable. With respect to the invention-specific interests, a reactive spreadable mass of the composition (A) is beneficially employed, capable of forming a polyurethane, which has a viscosity during the spreading out process of approximately 1 Pa s to approximately 20 Pa s. It is of benefit for the production sequence if the composition (A) presents a structurally viscous behavior.

The dwelling time during thermal hardening constitutes an essential factor with respect to manufacturing speed, which impacts upon the operational efficiency. Therefore, the thermal hardening steps preferably carried out over a time period of approximately 0.1 to 4 minutes at approximately 100 to 180° C. Particularly preferred is the thermal hardening step carried out over a time period of approximately 90 to 150 seconds at approximately 140 to 170° C., specifically at a temperature rising up to approximately 165° C.

Based on their properties, polyurethanes can only be impressed by way of costly methods. A finely structured grain can thus only be produced by reverse coating on negatively grained supports. According to a preferred specific embodiment of the invention, a non-sticky auxiliary support is therefore employed which shows the negative image of a desired image pattern. The invention also relates to the utilization of the bonding foil as lining for the insides of motor vehicles, whereby back-foaming with a polyurethane foam may be done in addition.

A multitude of benefits is attached to the invention. According to the invention, a bonding foil is made available which specifically satisfies, to a high degree, the requirements for the linings of motor vehicles, which is reflected, for example, in the excellent utility properties. In case of special designs, narrow radii inside the motor vehicle can be covered with the bonding foil. Good mechanical properties are achieved with respect to breaking elongation, grain stability and scratch resistance. The bonding foil according to the invention has the desired soft tactile feel and affords soft surface touch. The foil is deep drawable and commands sufficient firmness and dimensional stability in order to be processable with current standard methods on standard equipment in accordance with the state of the art. For example, a bonding foil according to the invention can be manufactured from two layers, whereby one layer, a thin polyurethane layer is produced by spreader method and another layer is provided in form of an ABS foil by way of calender method. Deep drawing and subsequent back foaming of the invention specific bonding foil are likewise possible. Another advantage is the cost friendly price of the employed materials compared with the expensive starter materials described in the state of the art. In the invention-specific method, use of a catalyst facilitates variation of the reactivity of the employed spreader masses, which leads to flexible design of the production sequence and to additional cost savings. The employable materials can be variably selected according to the specific target specifications and optimally adapted thereto. The invention specific bonding foils present, overall, outstanding physical/mechanical properties. High scratch resistance, high fade resistance and excellent solvent resistance, as well as very high thermal aging stability were ascertained.

In the following, the invention will be explained in more detail, making use of examples:

EXAMPLE 1

A decorative layer is produced, comprising a first and a second layer. The first layer is based on dissolved polyurethane, which is produced in the conventional way and has a thickness of 50 µm. This layer is definitely responsible for the physical/mechanical properties of the manufacturing bonding foil. The second layer is to be formed as an intermediary layer based on a high-solids-polyurethane (PUR) system, consisting of 1000 g polyetherpolyol, 400 g diphenylmethane-di-isocyanate (MDI) and 10 g nickel-acetyl-acetonate (10% in polyoxypropylene-glycol).

Said foil can be manufactured as follows:

A grained auxiliary carrier is coated by means of spreader blade, first with the mass of the dissolved polyurethane and then by means of another spreader blade with the high-solids-PUR-system. These masses are heated are up to 165° C. and interlinked in a through-type furnace.

Onto the cured PUR layer is then applied an adhesive (2K-PUR-System), either in line or in a separate process step, and a conventionally produced ABS foil is then laminated thereon.

EXAMPLE 2

A compact aliphatic polyurethane cover layer is produced from the following formula:

30 g poly(oxypropylene)diol,—molecular weight 4 000

70 g poly(oxypropylene)diol,—molecular weight 6 000

150 g poly(oxypropylene)triol,—molecular weight 12 000

68 g IPDI (NCO-contents approx. 13%) and 5 g Ni-acetylacetonate (10%)

After mixing of components, the recipe is spread out, in reverse process, by means of spreader equipment, onto an auxiliary support and cured at T=155° C.

EXAMPLES 3–6

The top or decorative layers from Examples 1 and 2 are respectively applied onto one of the support layers according to the following recipes:

Support Layer on PVC/ABS Basis:
20–50 parts PVC suspension
10–30 parts acrylonitrile-butadiene-styrene (MFI<5 g/min),
0–10 parts styrene-acrylonitrile-copolymerizate (MFI 15–25 g/10 min),
10–30 parts co-polymers (PE, vinyl acetate) (MFI 25–35 g/10 min),
2–10 parts plasticizer,
3–10 parts pigments,
1–3 parts processing adjuvants and
1–3 parts UV and Thermo-Stabilizers.

Support Layer on ASA Basis:
60–90 parts acrylonitrile-styrene-acrylate,
3–10 parts acrylonitrile-butadiene-styrene (MFI<5 g/10 min),
2–10 parts plasticizer,
3–10 parts pigments,
1–3 parts processing adjuvants and
1–3 parts UV and Thermo-Stabilizers, With the obtained bonding foils, outstanding physical/mechanical properties are achieved. High scratch resistance, high light resistance, excellent solvent resistance as well as very high thermal aging resistance were ascertained.

What is claimed is:

1. Pressure and vacuum deformable, grained bonding foil for linings of motor vehicle interiors comprising at least one support layer, a cover layer comprising at least one layered bed composed of polyurethane and optionally, an adhesion facilitator layer, a primary layer and additional layers, wherein the cover layer has a Shore D hardness of less than 50.

2. Bonding foil according to claim 1, wherein the support layer has a breaking elongation of about 50 to 500.

3. Bonding foil according to claim 1 wherein the thickness of the support layer is about 0.2 to 2 mm.

4. Bonding foil according to claim 1 wherein the Shore D hardness of the support layer is at least about 20.

5. Bonding foil according to claim 1 wherein the support layer comprises a thermoplastic.

6. Bonding foil according to claim 1 wherein a reverse side adhesive varnish is arranged on an exposed surface of the support layer.

7. Bonding foil according to claim 1 wherein the polyurethane layer was produced by dissolved polyurethane.

8. Bonding foil according to claim 1 including an additional layer comprised of polyurethane interlinked by a reactive high-solids-polyurethane(PUR)-system between the support layer and polyurethane layer.

9. Bonding foil according to claim 8, wherein a reactive high-solids-polyurethane (PUR)-system was employed in the formation of the interlinked polyurethane layer using approximately 100 parts by weight of polyetherpolyol, and about 400 parts by weight of methylene-di-isocyanate.

10. Bonding foil of claim 1 wherein said polyurethane layer has a Shore D hardness of less than about 40.

11. Bonding foil of claim 1, comprising an acrylonitrile-butadiene-styrene-co-polymerizate (ABS), an acrylonitrile-styrene-acrylic-ester-co-polymerizate (ASA), a blend of polyvinylchloride (PVC)/ABS, a thermoplastic olefin (TPO), an ABA/ASA-blend, a polyester such as polyethylene-terephthalate, a thermoplastic polyurethane and mixtures thereof.

* * * * *